US011329499B2

(12) United States Patent
Liu et al.

(10) Patent No.: US 11,329,499 B2
(45) Date of Patent: May 10, 2022

(54) POWER SYSTEM FOR HANDHELD DEVICE

(71) Applicant: ASUSTEK COMPUTER INC., Taipei (TW)

(72) Inventors: Chia-Yu Liu, Taipei (TW); Yii-Lin Wu, Taipei (TW); Kian-Ming Chee, Taipei (TW); Kai-Chun Liang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/146,930

(22) Filed: Jan. 12, 2021

(65) Prior Publication Data
US 2021/0226474 A1 Jul. 22, 2021

(30) Foreign Application Priority Data

Jan. 17, 2020 (TW) .................................. 109101731

(51) Int. Cl.
*H02J 7/34* (2006.01)
*H02J 7/02* (2016.01)

(52) U.S. Cl.
CPC .................. *H02J 7/34* (2013.01); *H02J 7/02* (2013.01); *H02J 2207/20* (2020.01); *H02J 2207/30* (2020.01)

(58) Field of Classification Search
CPC .. H02J 7/34; H02J 2207/20; H02J 7/02; H02J 2207/30
See application file for complete search history.

(56) References Cited

U.S. PATENT DOCUMENTS

2020/0006952 A1* 1/2020 Jang ...................... H02J 7/0045
2020/0403426 A1* 12/2020 Chen ..................... H02J 7/0068

FOREIGN PATENT DOCUMENTS

CN 204615444 U 9/2015
CN 208888811 U 5/2019

* cited by examiner

*Primary Examiner* — Jared Fureman
*Assistant Examiner* — Duc M Pham
(74) *Attorney, Agent, or Firm* — Muncy, Geissler, Olds & Lowe, P.C.

(57) ABSTRACT

A power system including a battery, a first port, a first converter, a second port, a second converter, a switch, a power controller, and a control unit is provided. The first port is electrically connected to the battery through a first charging/discharging path. The second port is electrically connected to the battery through a second charging/discharging path and is electrically connected to the first port through a third charging/discharging path. The first converter and the second converter are disposed on the first charging/discharging path and the second charging/discharging path respectively. The switch is disposed on the third charging/discharging path. The power controller is electrically connected to the first port and the second port for forming a power transmission mode with an external device. The control unit is configured to control the first converter, the second converter, and the switch according to the power transmission mode.

10 Claims, 6 Drawing Sheets device. In an embodiment, the power system 10 supplies

POWER SYSTEM FOR HANDHELD DEVICE

CROSS-REFERENCE TO RELATED APPLICATION

This application claims the priority benefit of Taiwan Application Serial No. 109101731, filed on Jan. 17, 2020. The entirety of the above-mentioned patent application is hereby incorporated by reference herein and made a part of the specification.

BACKGROUND OF THE INVENTION

Field of the Invention

The disclosure relates to a power system, and in particular, to a power system for a handheld device.

Description of the Related Art

Currently, handheld devices or mobile power supplies in the market support a plurality of ports. However, the ports in power systems of most conventional handheld devices or mobile power supplies support only one for charging and only one for outputting, and the function of the ports are preset and unchangeable.

In addition, when a power system of a conventional handheld device or mobile power supply is being charged, it cannot directly output power to charge another system. The power system needs to store power in the battery first and then converts and outputs the power from the battery. This conversion process increases power consumption.

BRIEF SUMMARY OF THE INVENTION

The disclosure provides a power system. The power system is connected to at least one external device. The power system includes a battery, a first port, a first charging/discharging path, a first converter, a second port, a second charging/discharging path, a third charging/discharging path, a second converter, a switch, a power controller, and a control unit.

The first port is electrically connected to the battery through a first charging/discharging path. The first converter is disposed on the first charging/discharging path. The second port is electrically connected to the battery through the second charging/discharging path, and is electrically connected to the first port through the third charging/discharging path. The second converter is disposed on the second charging/discharging path. The switch is disposed on the third charging/discharging path.

The power controller is electrically connected to the first port and the second port for establishing a power transmission mode with the at least one external device. The control unit is electrically connected to the switch and the power controller, and is configured to control the first converter, the second converter, and the switch according to the power transmission mode.

The architecture of the power system provided in the disclosure supports both power input (that is, charging) and power output (that is, power supply to external devices) operations. The power system includes a direct input/output mode, which allows to output external input power to charge an external device directly, thereby reducing conversion losses.

Specific embodiments used in disclosure are further described with reference to the following embodiments and drawings.

DETAILED DESCRIPTION OF THE EMBODIMENTS

The specific embodiments of the disclosure are further described below in detail with reference to the schematic diagrams. According to the following descriptions and claims, advantages and features of the disclosure are clearer. It should be noted that, all the drawings are in a quite simplified form and are not drawn to scale, and are only used for conveniently and clearly describing the objectives of the embodiments of the disclosure.

Figure 1:
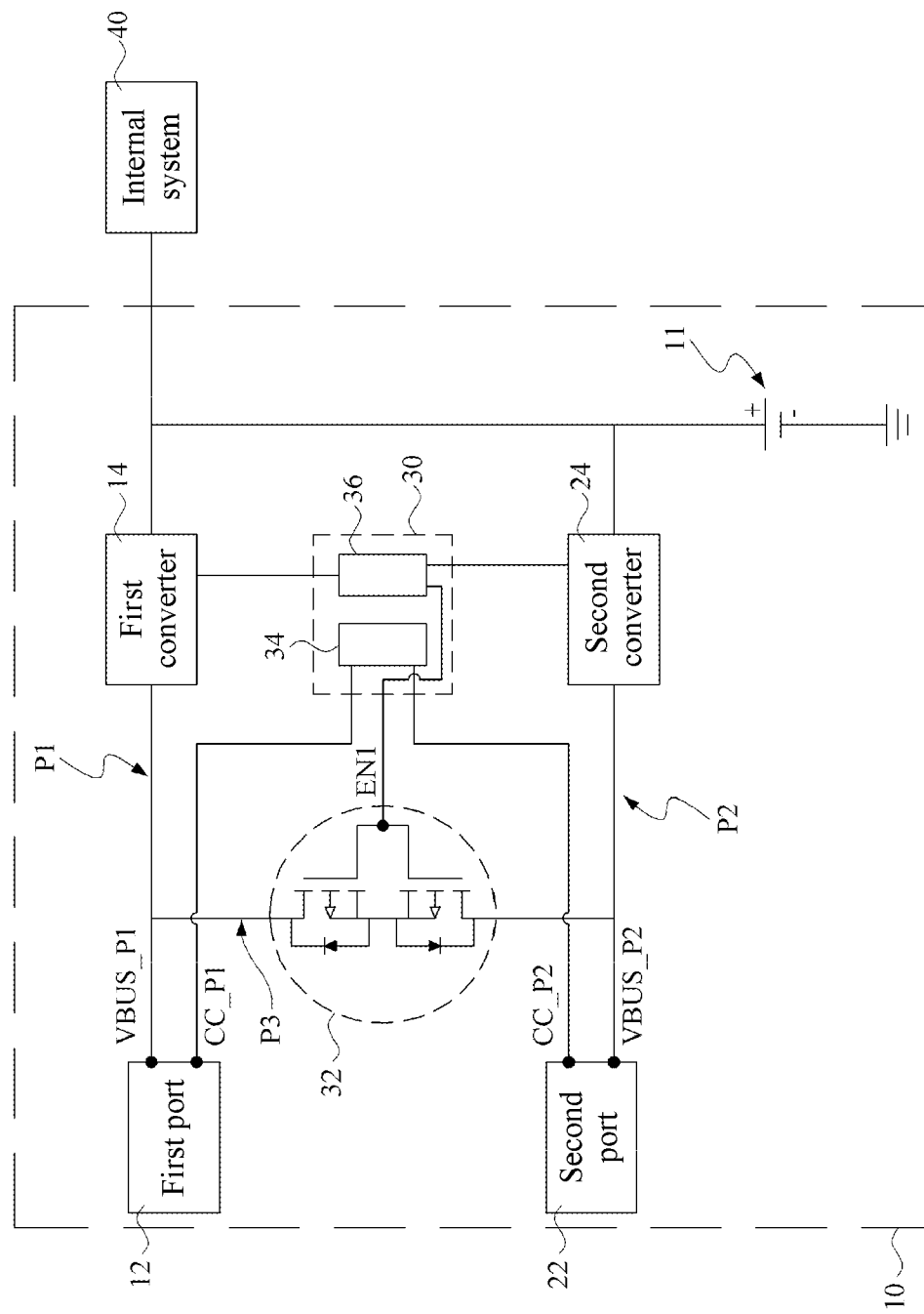
FIG. 1 is a schematic architectural diagram of an embodiment of a power system according to the disclosure.

FIG. 1 is a schematic architectural diagram of an embodiment of a power system according to the disclosure. The power system 10 is applied to a handheld device. The power system 10 connects to at least one external device (not shown in the figure), such as a universal serial bus (USB) device. In an embodiment, the power system 10 supplies power to or receives power from the external device.

As shown in the figure, the power system 10 includes a battery 11, a first port 12, a first converter 14, a second port 22, a second converter 24, a switch 32, and a controller 30.

The first port 12 is electrically connected to the battery 11 through a first charging/discharging path P1. The second port 22 is electrically connected to the battery 11 through a second charging/discharging path P2. The second port 22 is electrically connected to the first port 12 through a third charging/discharging path P3. In an embodiment, the first port 12 and the second port 22 are ports with the same type, such as USB type-C ports. In another embodiment, the first port 12 and the second port 22 are ports with different types, such as a USB Type-A port and a USB Type-C port.

Taking USB ports for example, as shown in the figure, one end of the first charging/discharging path P1 is electrically connected to a power contact VBUS_P1 of the first port 12, the other end is electrically connected to a positive electrode of the battery 11, one end of the second charging/discharging path P2 is electrically connected to a power contact VBUS_P2 of the second port 22, and the other end is electrically connected to a positive electrode of the battery 11.

Two ends of the third charging/discharging path P3 are electrically connected to the power contact VBUS_P1 of the first port 12 and the power contact VBUS_P2 of the second port 22 respectively. In an embodiment, as shown in the figure, an internal system 40 of the handheld device either receives power from the battery 11, or receives power from an external device by electrically connecting to the first port 12 and the second port 22 through the first charging/discharging path P1 and the second charging/discharging path P2, respectively.

The first converter 14 is disposed on the first charging/discharging path P1. The second converter 24 is disposed on the second charging/discharging path P2. The switch 32 is disposed on the third charging/discharging path P3. In an embodiment, the switch 32 is a metal oxide semiconductor (MOS) element, such as a complementary metal oxide semiconductor (COMS) element.

To comply with different charging/discharging specifications and meet the requirements of ports for output power, in an embodiment, the first converter 14 is a buck-boost converter. The buck-boost converter converts a battery voltage into an appropriate charging voltage according to different charging/discharging specifications, to supply power to the outside through the first port 12. In an embodiment, the first converter 14 is a buck-boost conversion chip or a buck-boost conversion circuit.

Similarly, in an embodiment, the second converter 24 is also a buck-boost converter. Secondly, according to the requirements on circuit configuration, in an embodiment, the first converter 14 is a power conversion chip or a power conversion circuit. Similarly, in an embodiment, the second converter 24 is also a power conversion chip or a power conversion circuit.

The controller 30 includes a power delivery (PD) controller 34 and a control unit 36. In an embodiment, the controller 30 is a control chip. In an embodiment, the controller 30 is a micro control unit (MCU).

The power controller 34 is electrically connected to the first port 12 and the second port 22 for establishing a power transmission mode with the at least one external device. Taking USB Type-C ports for example, in an embodiment, the power controller 34 establishes a corresponding power transmission mode with the external device through channel configuration (CC) contacts CC_P1 and CC_P2 of the first port 12 and the second port 22.

In an embodiment, the power transmission mode includes: whether the power system or the external device serves as a source, and a charging specification between the power system 10 and the external device. In an embodiment, the power controller 34 is a power delivery control chip.

The control unit 36 is electrically connected to the switch 32 and the power controller 34, and communicates with the external device according to the power controller 34 to establish a power transmission mode between the power system 10 and the external device.

The control unit 36 controls the operation of the first converter 14 and the second converter 24 under the power transmission mode. In addition, the control unit 36 outputs a control signal EN1 under the power transmission mode to control the switch 32 enters an on state. Details about the operation of the control unit 36 will be described in detail in the subsequent paragraphs corresponding FIG. 3 to FIG. 6.

Figure 2:
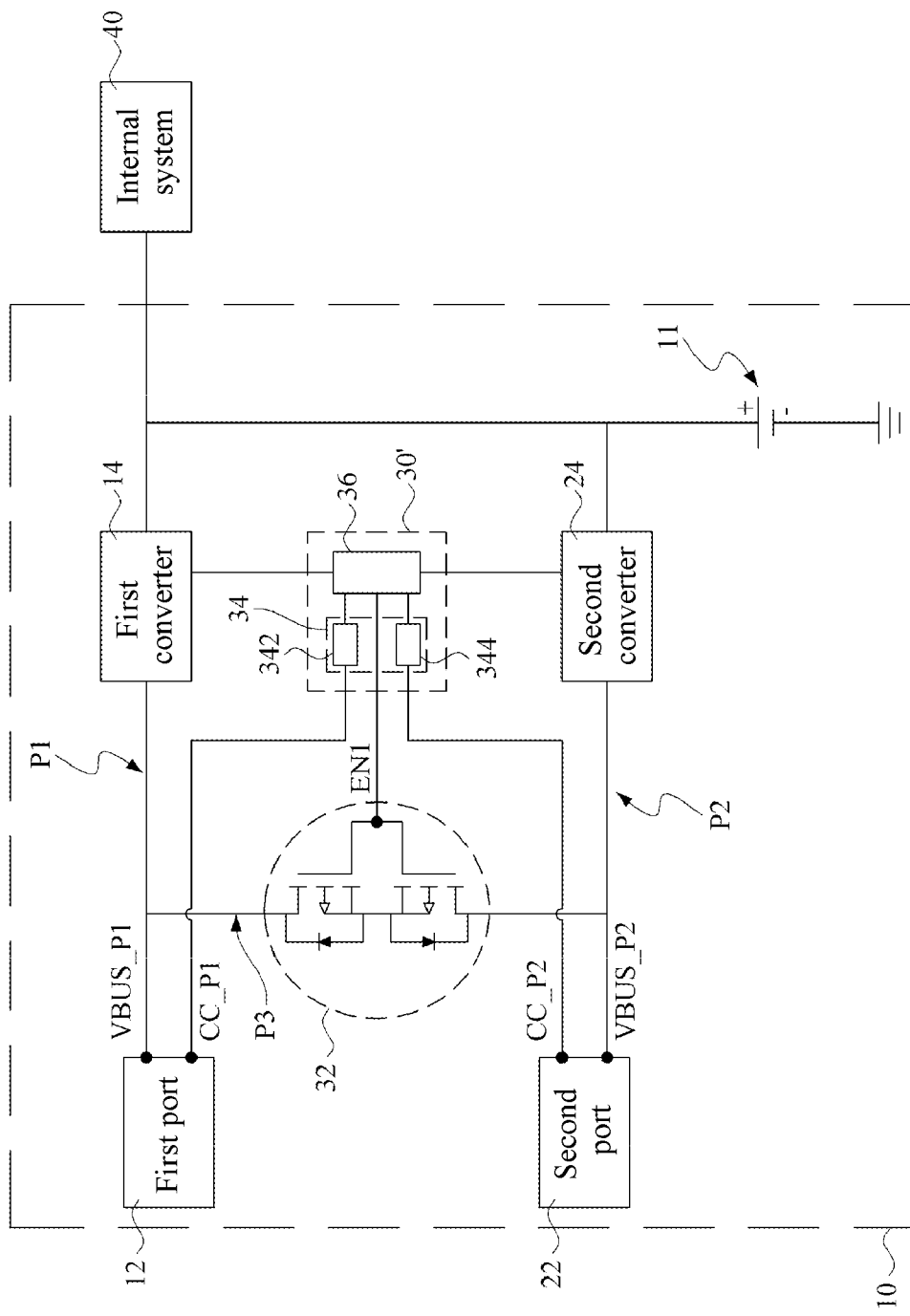
FIG. 2 is a schematic architectural diagram of another embodiment of a power system according to the disclosure.

FIG. 2 is a schematic architectural diagram of another embodiment of a power system according to the disclosure. A main difference between this embodiment and the embodiment of FIG. 1 lies in architectures of the controllers 30 and 30'. As shown in the figure, the controller 30' of this embodiment includes a first power delivery unit 342, a second power delivery unit 344, and a control unit 36.

The first power delivery unit 342 is electrically connected to the first port 12, to communicate with an external device connected to the first port 12. The second power delivery unit 344 is electrically connected to the second port 22, to communicate with an external device connected to the second port 22. In an embodiment, the first power delivery unit 342 is a power delivery control chip, and the second power delivery unit 344 is also a power delivery control chip.

Figure 3:
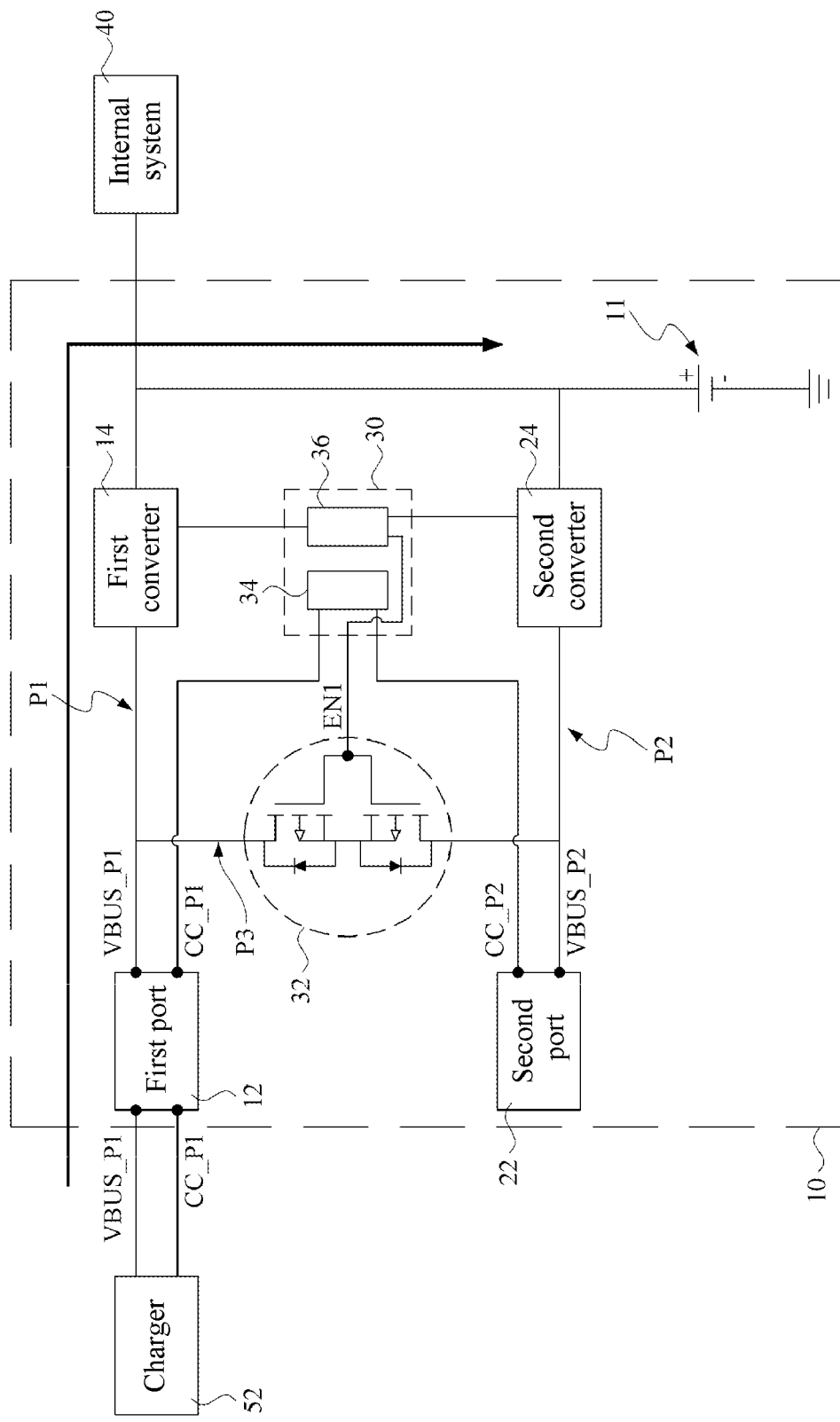
FIG. 3 to FIG. 6 show different power transmission operations of charging/discharging of the power system of FIG. 1.
Figure 4:
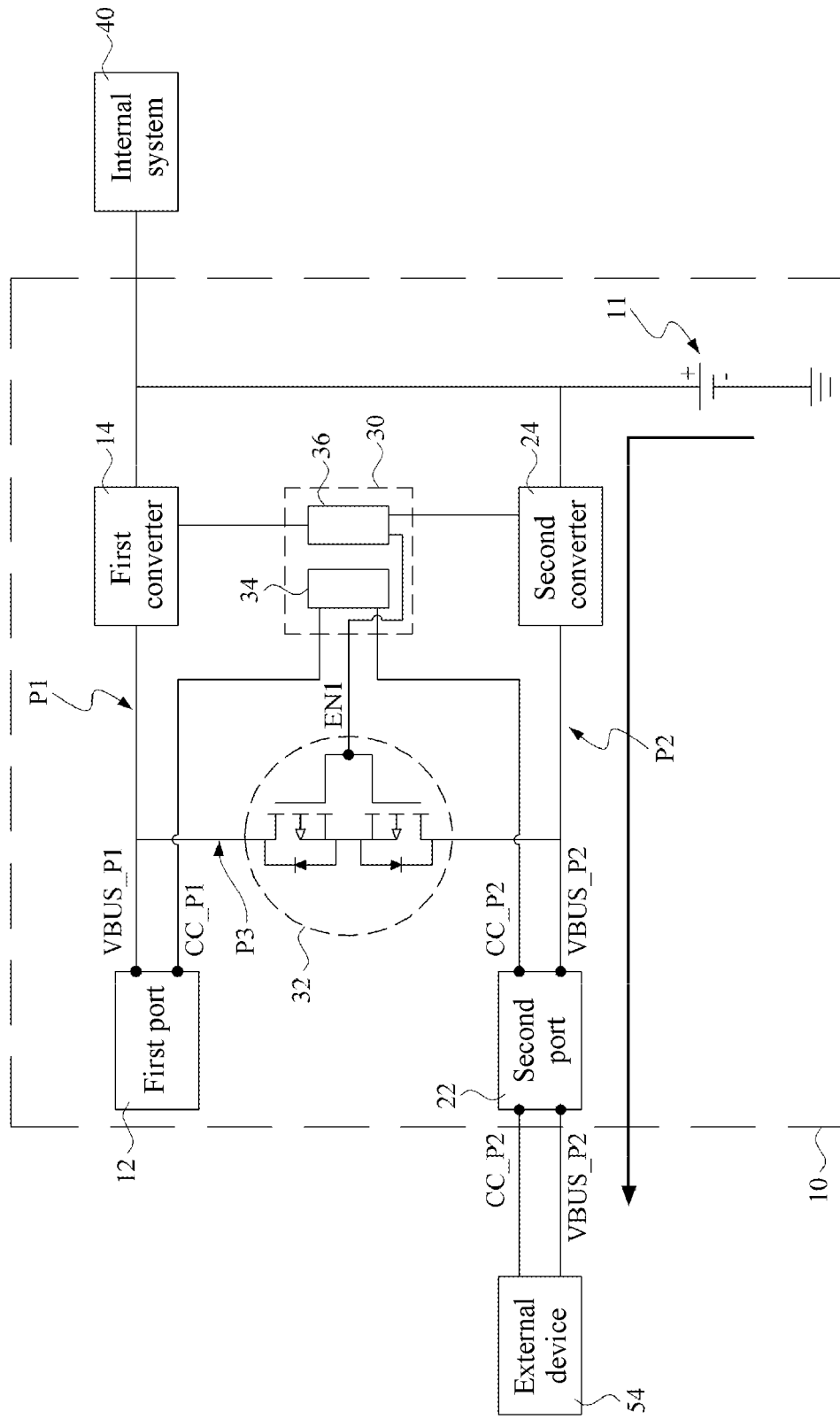
Figure 5:
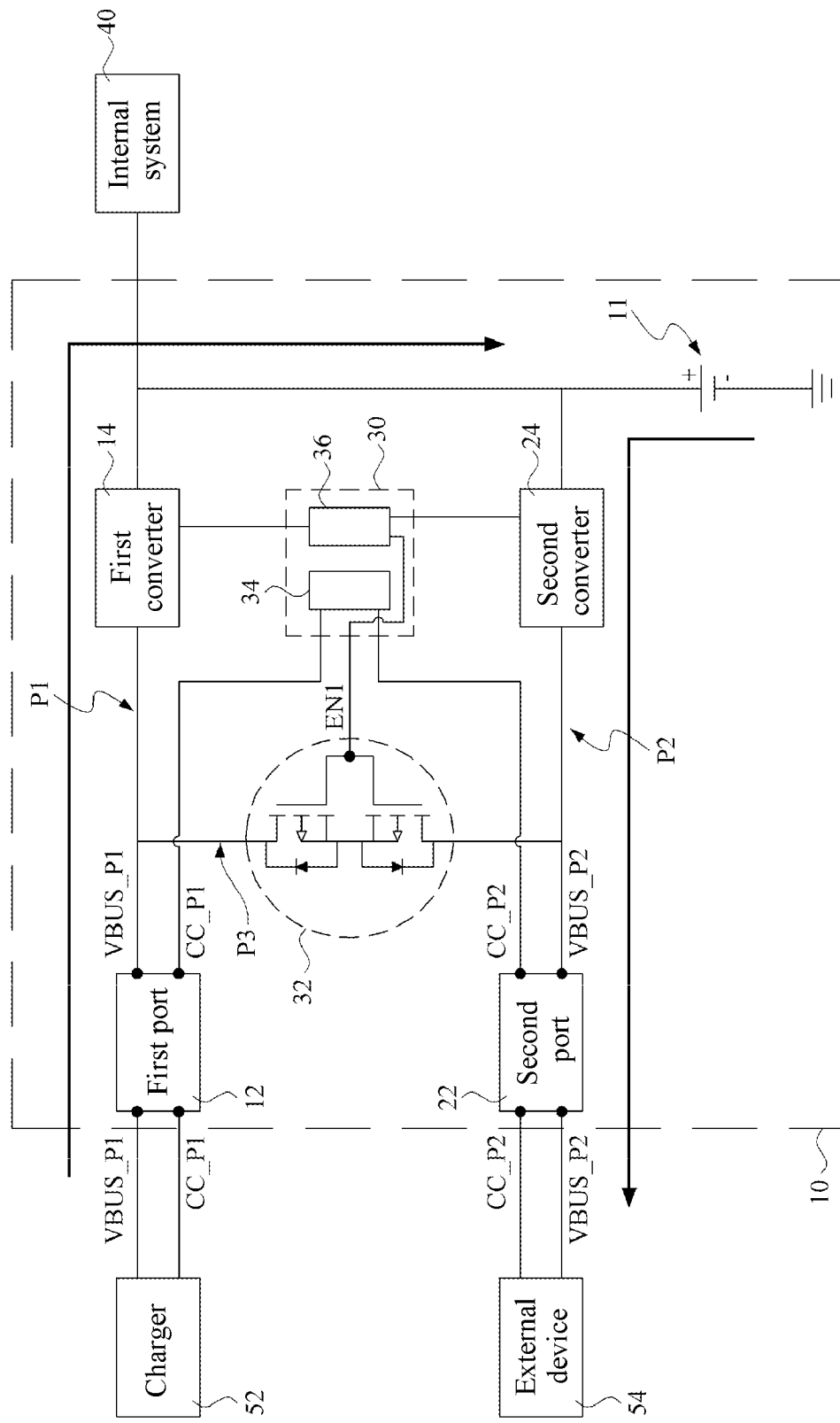
Figure 6:
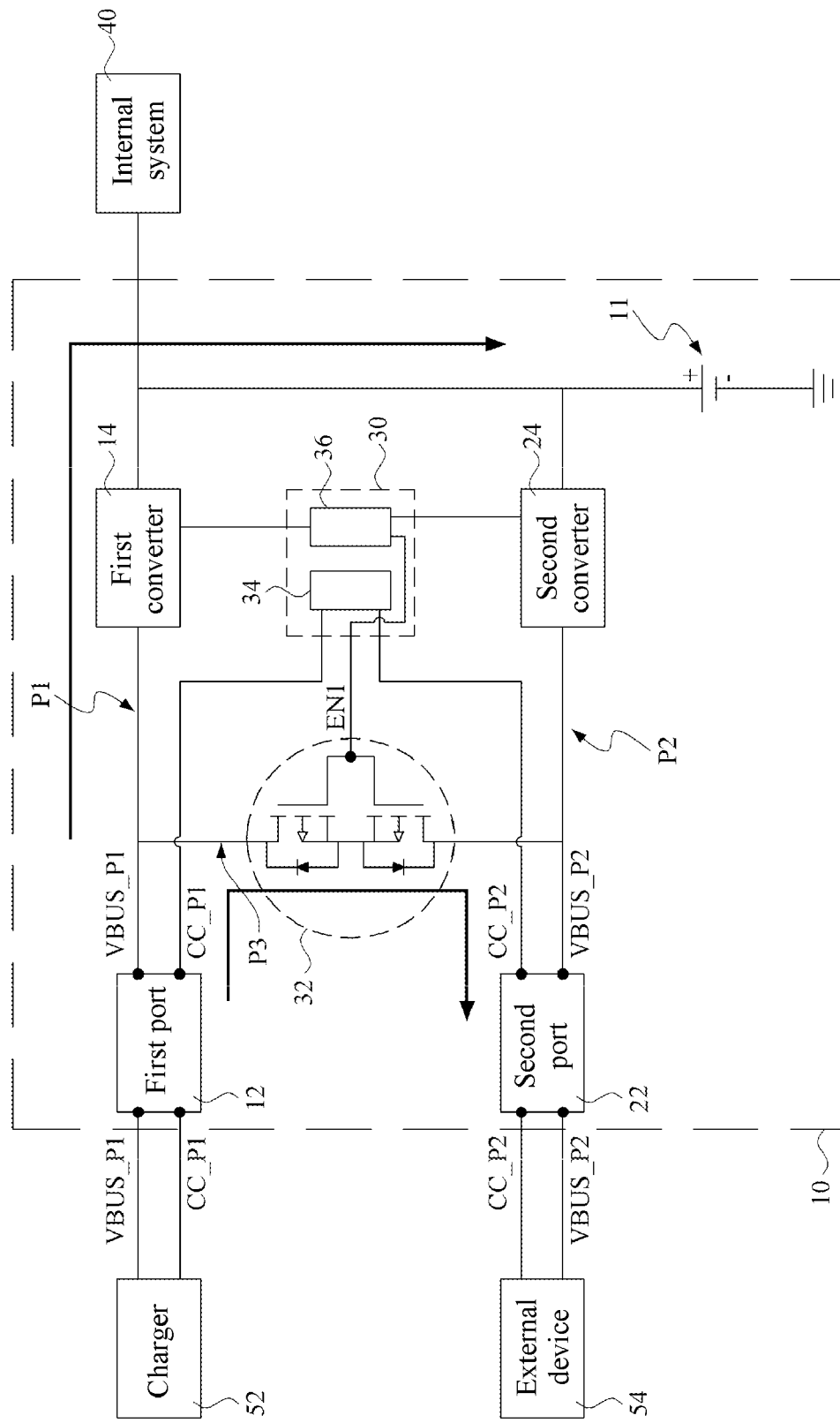

FIG. 3 to FIG. 6 show different power transmission operations of charging/discharging of the power system 10 of FIG. 1. The power system 10 supporting a USB interface is used as an example for description in the figures. FIG. 3, which shows an operation of charging the battery or the internal system of the handheld device through one port. FIG. 4 shows an operation of discharging an external device through one port. FIG. 5 shows operations of charging through one port and discharging through the other port. FIG. 6 shows an operation in an input/output direct mode.

As shown in FIG. 3, the power system 10 in the disclosure supports an operation of charging the battery 11 or supplying power to the internal system 40 of the handheld device through any port (where the first port 12 is used as an example in the figure). As shown in the figure, when the first port 12 is connected to a charger 52 (that is, an external device), the controller 30 communicates with the charger 52 through the first port 12, and determines that a charging operation is to be performed through the first charging/discharging path P1.

Then, the controller 30 controls the first converter 14 to convert power supplied by the charger 52 into appropriate power to charge the battery 11 or supply power to the internal system 40. The charger 52 shown in the figure is an embodiment of the disclosure. In another embodiment, the external device is an adapter or a charging port (such as a USB port) on a computer.

As shown in FIG. 4, the power system 10 in the disclosure supports an operation of supplying power to an external device through any port (where the second port 22 is used as an example in the figure). As shown in the figure, when the second port 22 is connected to an external device 54, the controller 30 communicates with the external device 54 through the second port 22, and determines that discharging operation is to be performed through the second charging/discharging path P2. Then, the controller 30 controls the second converter 24 to convert the power supplied by the battery 11 into appropriate power to supply power to the external device 54 through the second port 22.

As shown in FIG. 5, the power system 10 in the disclosure supports operations of charging through one port (where the first port 12 is used as an example in the figure) and discharging through the other port (where the second port 22 is used as an example in the figure).

In an embodiment, when power needs to be supplied to the internal system 40 or the battery 11, as well as to supply power to the external device 54, the power system 10 in the disclosure is conducted as shown in FIG. 4. Depending on the difference between charging/discharging voltages such as the difference between regular USB charging and USB PD specification for quick charging, the operation shown in FIG. 5 includes the following four modes.

Mode 1: Low-Voltage Charging and Low-Voltage Outputting

When the charger 52 connected to the first port 12 does not support USB PD specification for quick charging and the external device 54 connected to the second port 22 does not support USB PD specification for quick charging, the charger 52 maintains a power supply voltage at 5 V, and supplies power to the internal system 40 through the power contact VBUS_P1 of the first port 12 and the first charging/discharging path P1. Meanwhile, a voltage provided by the battery 11 is converted into a fixed voltage of 5 V through the second converter 24, and outputted to the external device 54 through the power contact VBUS_P2 of the second port 22 for charging.

Mode 2: Low-Voltage Charging and High-Voltage Outputting

When the charger 52 connected to the first port 12 does not support USB PD specification for quick charging but the external device 54 connected to the second port 22 supports USB PD specification for quick charging, the external device 54 communicates with the power controller 34 through the channel configuration contact CC_P2 of the second port 22, and determines that a power transmission mode of the second charging/discharging path P2 is a USB PD specification for quick charging mode.

Then, the control unit 36 controls the second converter 24 to convert the battery voltage into a high voltage (where the voltage obtained after conversion ranges from 5 V to 20 V according to different power supply specifications) and output the high voltage to the external device 54 through the power contact VBUS_P2 of the second port 22 for charging. For the low-voltage charging part, the operation is similar to that of mode 1, and will not be described herein again.

Mode 3: High-Voltage Charging and Low-Voltage Outputting

When the charger 52 connected to the first port 12 supports USB PD specification for quick charging but the external device 54 connected to the second port 22 does not support USB PD specification for quick charging, the power controller 34 communicates with the charger 52 through the channel configuration contact CC_P1 of the first port 12, and establishes a power transmission mode that the first charging/discharging path P1 is a USB PD specification for quick charging mode.

In this case, the charger 52 outputs power at a high voltage (which ranges from 5 V to 20 V according to different power supply specifications) to the battery 11 through the power contact VBUS_P1 of the first port 12 for quick charging. For the low-voltage output part, the operation is similar to that of mode 1, and will not be described herein again.

Mode 4: High-Voltage Charging and High-Voltage Output

When the charger 52 connected to the first port 12 supports USB PD specification for quick charging and the external device 54 connected to the second port 22 also supports USB PD specification for quick charging, the power controller 34 communicates with the charger 52 through the channel configuration contact CC_P1 of the first port 12, and establishes a power transmission mode that the first charging/discharging path P1 is a USB PD specification for quick charging mode.

In addition, the external device 54 communicates with the power controller 34 through the channel configuration contact CC_P2 of the second port 22, and establishes a power transmission mode that the second charging/discharging path P2 is a USB PD specification for quick charging mode. In this case, the charger 52 charges the battery 11 quickly at a high voltage (which ranges from 5 V to 20 V according to different power supply specifications) through the power contact VBUS_P1 of the first port 12.

Meanwhile, the control unit 36 also controls the second converter 24 to convert the battery voltage into a high voltage (where the voltage obtained after conversion ranges from 5 V to 20 V according to different power supply specifications) and output the high voltage to the external device 54 through the power contact VBUS_P2 of the second port 22 for charging.

In the foregoing modes, the roles of the first port 12 and the second port 22 are interchangeable. In addition, in the foregoing modes, the control unit 36 controls the switch 32 to remain in an off state, to prevent a charging/discharging current from flowing through the third charging/discharging path P3.

FIG. 6 shows an input/output direct mode of the power system of FIG. 1. When the connected charger 52 or external device 54 meets a preset condition, which is that the two support the same charging specification in an embodiment, the power system 10 in the disclosure enables the input/output direct mode, that is, the switch 32 is switched to an on state, so that a charging voltage provided by the charger 52 is directly provided to the external device 54 through the third charging/discharging path P3, thereby reducing conversion losses.

Therefore, in the input/output direct mode, a charging voltage received from the power contact VBUS_P1 of the first port 12 is equal to a discharging voltage outputted from the power contact VBUS_P2 of the second port 22.

In an embodiment, the input/output direct mode is manually enabled by a user. In other words, when the user needs to increase the charging efficiency for the external device, the user manually enables the input/output direct mode, to replace the operation mode shown in FIG. 4. In another embodiment, the input/output direct mode is automatically enabled by the power system 10.

In an embodiment, when the charger 52 connected to the first port 12 supports USB PD specification for quick charging and the external device 54 connected to the second port 22 supports USB PD specification for quick charging, the power system 10 enables the input/output direct mode.

In the input/output direct mode, the power controller 34 communicates with the charger 52 through the channel configuration contact CC_P1 of the first port 12, calculates a charging voltage provided by the charger 52, allocate a part of the charging voltage to ensure system operation (including the power system 10 and the internal system 40), and the remaining part of the charging voltage to charge the external device 54.

In other words, in the input/output direct mode, most of power provided by the charger 52 is supplied to the external device 54 through the third charging/discharging path P3, and a small part of the power is supplied to the battery 11 or the internal system 40 through the first charging/discharging path P1. In addition, in this mode, the second converter 24 located on the second charging/discharging path P2 does not operate.

In conclusion, the power controller 34 of the power system 10 provided in the disclosure separately communicates with the external device through the first port 12 and the second port 22 for establishing a power transmission mode, the control unit 36 controls operation of the first converter 14 and the second converter 24 according to the power transmission mode, to support both power input (that is, charging) and power output (that is, power supply to external devices) operations. In addition, the control unit 36 controls the switch 32 to enter an on state, so as to enable the input/output direct mode to directly output power that externally inputted to the external device for charging, thereby reducing conversion losses.

The foregoing descriptions are merely exemplary embodiments of the disclosure, and do not limit the disclosure. Any equivalent replacement or modification made to the technical means and the technical content disclosed by the disclosure by any person skilled in the art without departing from the scope of the technical means of the disclosure shall fall within the protection scope of the disclosure.

What is claimed is:

1. A power system, configured to connect to at least one external device, and the power system comprising:
- a battery;
- a first port, electrically connected to the battery through a first charging/discharging path;
- a first converter, disposed on the first charging/discharging path;
- a second port, electrically connected to the battery through a second charging/discharging path, and electrically connected to the first port through a third charging/discharging path;
- a second converter, disposed on the second charging/discharging path;
- a switch, disposed on the third charging/discharging path;
- a power controller, electrically connected to the first port and the second port for establishing a power transmission mode with the at least one external device; and
- a control unit, electrically connected to the switch and the power controller, and configured to control the first converter, the second converter, and the switch according to the power transmission mode,
- wherein the third charging/discharging path has one end connected to the first charging/discharging path between the first port and the first converter, and another end connected to the second charging/discharging path between the second port and the second converter.

2. The power system according to claim 1, wherein the first converter is a buck-boost converter.

3. The power system according to claim 1, wherein the second converter is a buck-boost converter.

4. The power system according to claim 1, wherein the first converter is a buck-boost conversion chip or a buck-boost conversion circuit.

5. The power system according to claim 1, wherein the first port is a universal serial bus port.

6. The power system according to claim 1, wherein the second port is a universal serial bus port.

7. The power system according to claim 1, wherein the power controller comprises a first power delivery unit and a second power delivery unit, the first power delivery unit is electrically connected to the first port, and the second power delivery unit is electrically connected to the second port.

8. The power system according to claim 1, wherein the power transmission mode comprises an input/output direct mode, and when the power transmission mode is the input/output direct mode, the control unit controls the switch to enter an on state.

9. The power system according to claim 1, wherein the power transmission mode comprises a quick charging mode.

10. The power system according to claim 1, wherein the power controller and the control unit are integrated in a micro control unit (MCU).

* * * * *